United States Patent

Nishijima et al.

[11] Patent Number: 5,846,091
[45] Date of Patent: Dec. 8, 1998

[54] CIRCUIT AND ITS CONNECTING STRUCTURE ASSEMBLY IN MOTORCAR DOOR

[75] Inventors: Masataka Nishijima; Keizo Nishitani; Akio Minami, all of Shizuoka, Japan

[73] Assignee: Yazaki Corporation, Tokyo, Japan

[21] Appl. No.: 826,420

[22] Filed: Mar. 27, 1997

[30] Foreign Application Priority Data

Mar. 29, 1996 [JP] Japan ................................. 8-077203

[51] Int. Cl.$^6$ .................................................. H01R 33/00
[52] U.S. Cl. ...................... 439/34; 174/72 A; 301/10.1
[58] Field of Search ............................. 296/146.7, 153; 307/10.1; 174/72 A; 439/34

[56] References Cited

U.S. PATENT DOCUMENTS

| | | | |
|---|---|---|---|
| 4,815,984 | 3/1989 | Sugiyama et al. | 439/34 |
| 4,824,164 | 4/1989 | Nakayama et al. | 439/34 |
| 4,848,829 | 7/1989 | Kidd | 439/34 |
| 4,869,670 | 9/1989 | Ueda et al. | 439/34 |
| 5,460,530 | 10/1995 | Toba et al. | 439/34 |
| 5,462,999 | 10/1995 | Kidd et al. | 439/34 |

FOREIGN PATENT DOCUMENTS 64-14550  1/1989  Japan .

Primary Examiner—Gary F. Paumen
Attorney, Agent, or Firm—Armstrong, Westerman, Hattori, McLeland & Naughton

[57] ABSTRACT

A circuit and its connecting structure assembly provided in a motorcar door includes an inner unit being able to joint to a door panel, and an arm rest unit attached on the inner unit. The inner unit has an inner panel provided with a circuit, a plurality of auxiliary components connected to the circuit, and an integrated connector section. The arm rest unit includes a connector portion corresponding to the integrated connector section, a control circuit board connected to the connector portion and to a switch section for the auxiliary components, a circuit provided in the arm rest body and connected to the control circuit board, and an optional switch connected to the circuit. In the optional switches connected to the circuit provided in the arm rest unit, software replacement of the control circuit board can change the functions of the optional switches.

9 Claims, 4 Drawing Sheets

CIRCUIT AND ITS CONNECTING STRUCTURE ASSEMBLY IN MOTORCAR DOOR

BACKGROUND OF THE INVENTION

1. Field of the Invention

The present invention relates to a circuit and its connecting structure assembly provided in a motorcar door, in which connection of wiring harnesses in the door is carried out by using an inner unit and an arm rest unit that are separately fabricated and attached to the door.

2. Description of the Prior Art

FIG. 5 shows a circuit and its connecting structure assembly disclosed in Japanese Utility Model Application Laid-open No. 64-14550.

This assembly has a plurality of connectors 62 to 64 provided on a metal panel 61 of a motor car door. Further, on a trimming plate 66 united with an arm rest 65 there is mounted a rigid flat circuit board 67. The arm rest 65 is fixed to the door panel 61. The connectors 62 to 64 connect respectively to connectors 68 to 70 that are terminals of the flat circuit board 67.

The connector 62 on the door panel 61 connects to a wiring harness 71 in the vehicle side. The connectors 63, 64 connect to auxiliary parts such as a power window motor, a door locking motor, or a courtesy lamp. Then, the door panel 61 is fitted with the arm rest 65 and subsequently a door trimming main panel (not shown).

However, the aforementioned known circuit with the connecting structure assembly in the motorcar door has the drawback that it requires careful assembling hand work. Because, completely engaging the connector 62 to 64 on the door panel 61 with the connectors 68 to 70 in the arm rest 65 needs sequential positive hand work of the connectors. Besides, recent diversification of optional components has been requiring a circuit and its connecting structure assembly to meet various specifications of the switches. Moreover, there may possibly be incomplete electrical connection in the connected circuits, because lead wires 72 for auxiliary components 73 in the door panel 61 may be subjected to jamming or abnormal stretching when connected.

SUMMARY OF THE INVENTION

In view of the above-mentioned drawbacks, an object of the present invention is to provide a circuit and its connecting structure assembly of a motor car door, which requires little fitting work and can satisfy various optional specifications. Further, the assembly can eliminate a possible disadvantage such as jamming of lead wires for auxiliary components.

For accomplishing the object, a circuit and its connecting structure assembly provided in a motorcar door according to the invention basically includes:

an inner unit being able to joint to a door panel, and
an arm rest unit attached on the inner unit,
wherein the inner unit includes an inner panel provided with a circuit, a plurality of auxiliary components connected to the circuit, and an integrated connector section; and
the arm rest unit includes a connector portion corresponding to the integrated connector section, a control circuit board connected to the connector portion and to a switch section for the auxiliary components, a circuit provided in a body of the arm rest body and connected to the control circuit board, and an optional switch connected to the circuit.

The auxiliary components in the inner unit effectively have a plurality of outwardly exposed contacting terminals, and the circuit in the inner panel has a wiring end portion for connection of the contacting terminals.

The control circuit board may advantageously be detachably mounted in a compartment formed in the arm rest body.

The arm rest body may be unitedly formed with an optional switch case, a receiving case for the auxiliary components, and a connector housing for connectors located in the door panel; the cases and the connector housing are respectively provided with a wiring end portion for the circuit provided in the arm rest unit. Moreover, the optional switches effectively connect to the circuit provided in the arm rest unit; and software replacement of the control circuit board can change the functions of the optional switches.

DETAILED DESCRIPTION OF THE PREFERRED EMBODIMENTS

With referring to the accompanying drawings, a specified embodiment of the invention will be discussed in detail.

Figure 1:
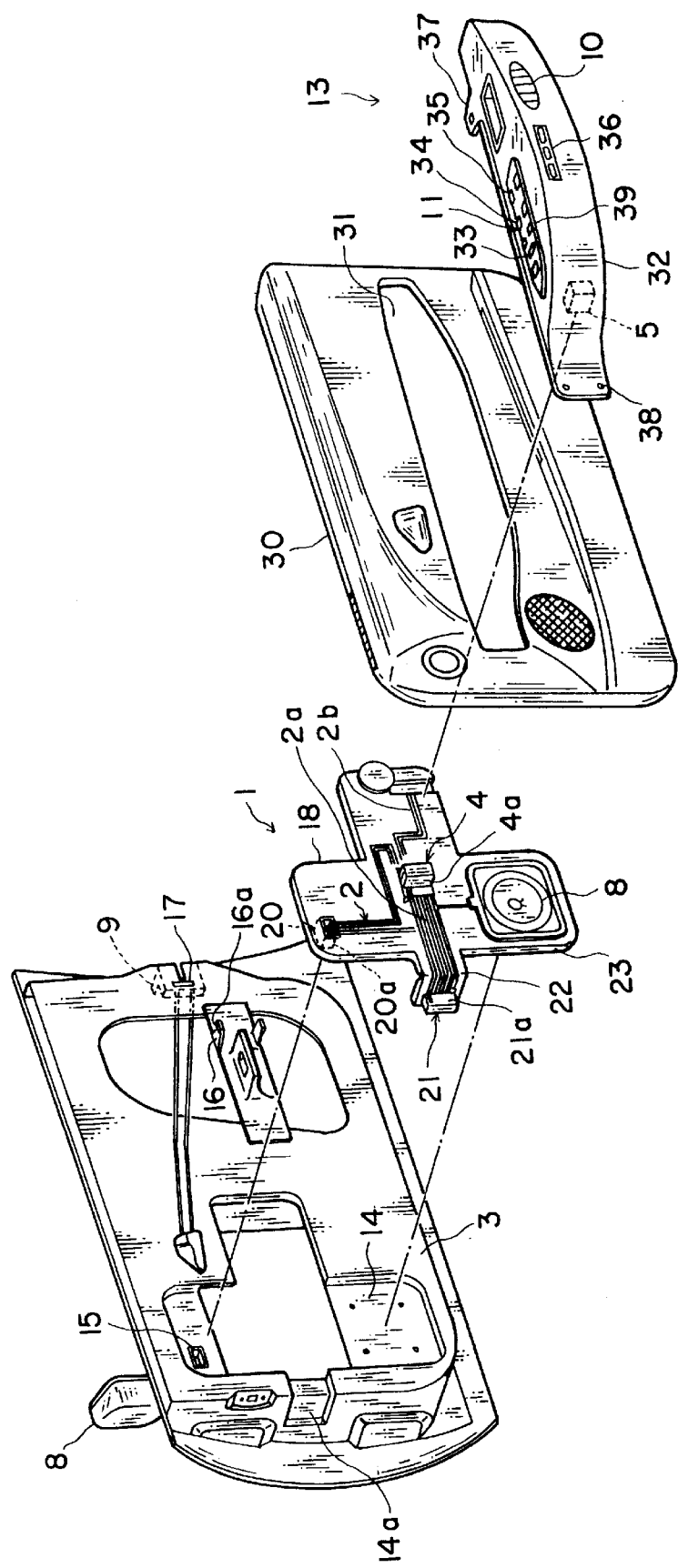
FIG. 1 is an exploded perspective view showing an embodiment of a circuit and its connecting structure assembly for a motorcar door according to the invention.
Figure 2:
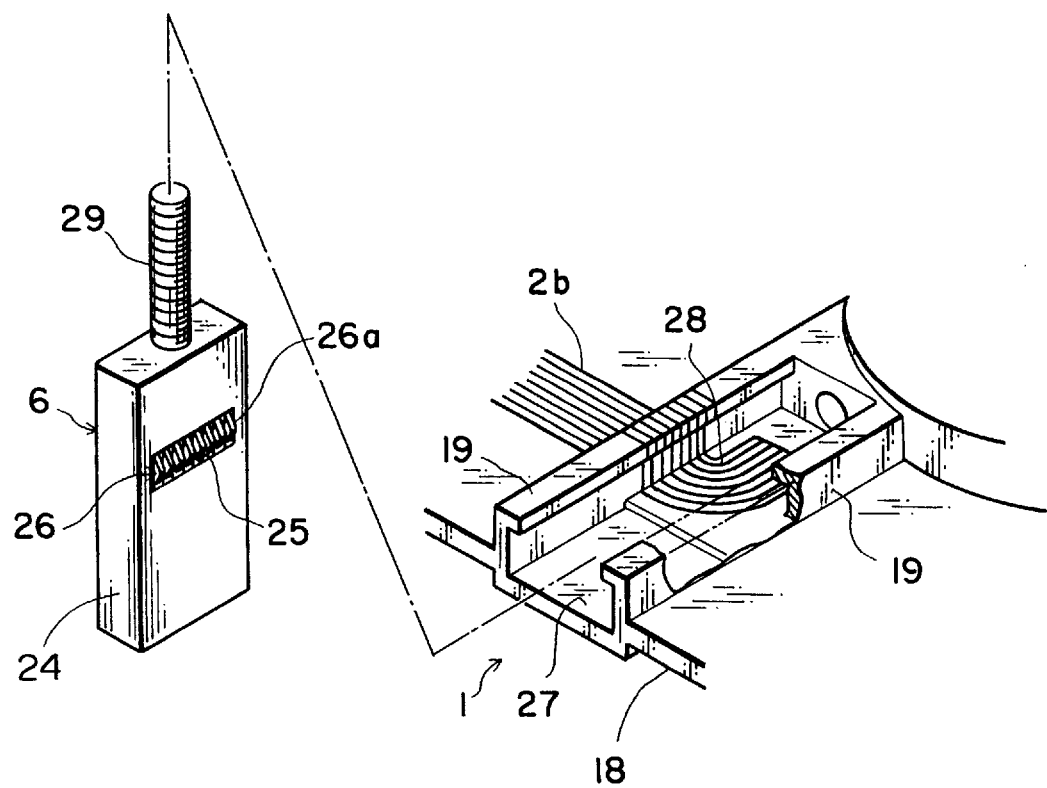
FIG. 2 is an exploded perspective view showing a connecting structure of a P/W motor according to the invention.
Figure 3:
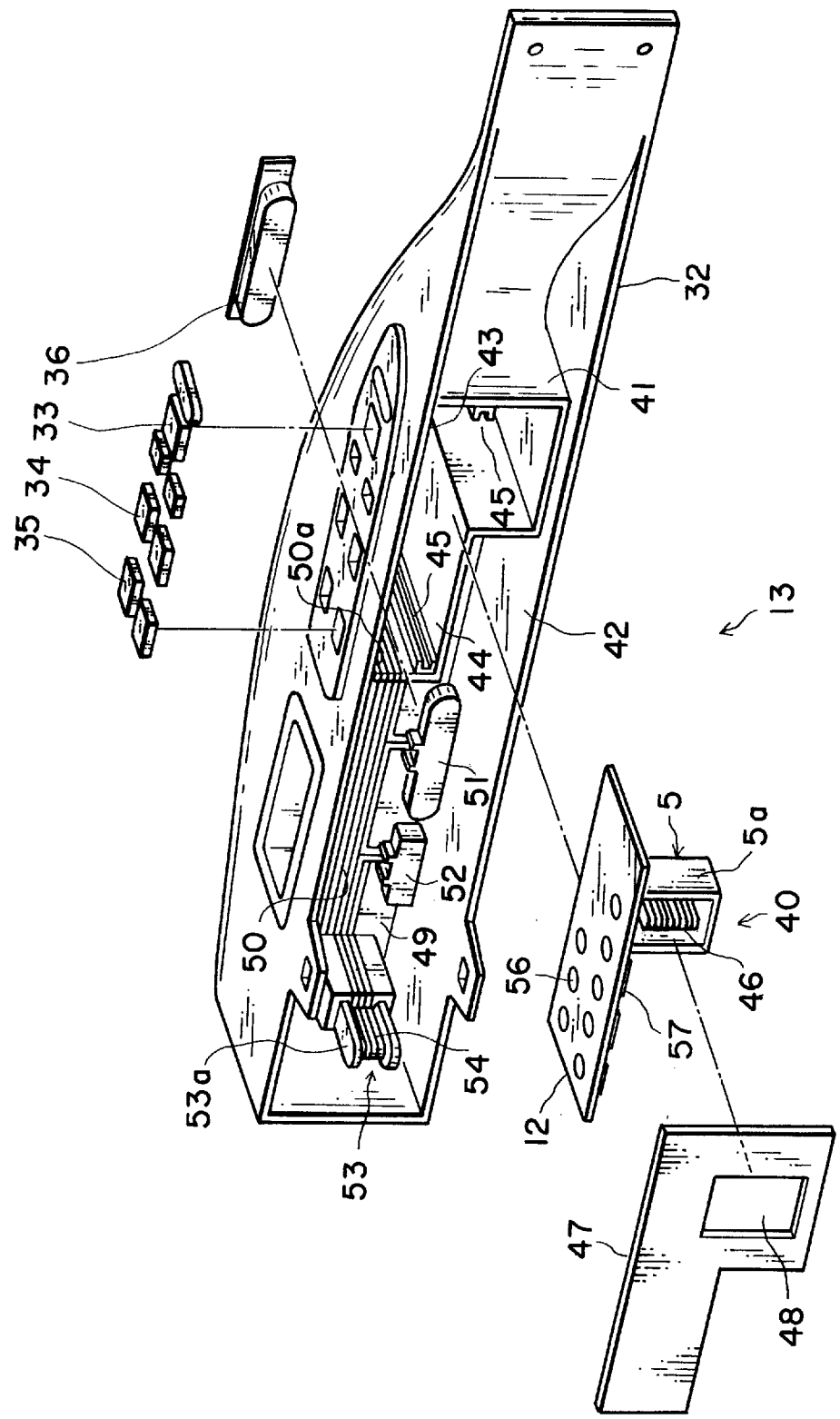
FIG. 3 is an exploded perspective view of an arm rest unit related to the invention.

FIGS. 1 to 3 show an embodiment of a circuit and its connecting structure assembly in a motorcar door according to the invention.

This assembly includes a three-dimensional circuit 2 adjacently connected to auxiliary components such as a power window motor 6 (FIG. 2) and arranged just on a surface of an inner unit 1. The inner unit 1 is fitted to a door panel 3, and an arm rest unit 13 is attached also to the door panel 3 with the inner unit 1 therebetween. The arm rest unit 13 has a connector 5 (FIG. 3) mating with an integrated connector 4 for connecting the three-dimensional circuit 2. The arm rest unit 13 also includes a switch board 11 and a control circuit board 12 (FIG. 3) that relate to a plurality of auxiliary components 6 to 10.

The door panel 3 (an outer panel) made of metal has an approximately T-shaped fitting recess 14 for receiving the inner unit 1 in the fore half thereof. In an upper portion of the recess 14 there is disposed a female connector 15 for connection to a door mirror driving circuit. The recess 14 has a cut-out 14a at a fore end thereof to connect a wiring harness located around the door. In the rear half of the door panel 3 there are arranged a pair of upper and lower engagement projections 16 for fitting the arm rest unit 13, and also a female connector 17 for connection to a door locking unit side. The engagement projection 16 has an engaging hook 16a at its fore end.

The inner unit 1 made of an electrically insulating synthetic resin such as ABS resin has an approximately T-shaped inner panel 18. On a surface of the inner panel 18 there is disposed the three-dimensional circuit 2, for example, by meterizing an electrically conductive plating metal in the circuit pattern. Each of circuit ends of the three-dimensional circuit 2 connects each of a plurality of male connector housings 4a, 20a, 21a unitedly formed with the panel 18. In the circuit 2, a circuit 2a connects to a speaker 8 (an auxiliary component) and another circuit 2b connects to the power window motor 6 (FIG. 2) that is referred as a P/W motor hereafter.

The inner panel 18 has an L-shaped angled portion 22 engaging with the fore end recess 14a in the door panel 3 at its fore end. The angled portion 22 has a connector 21 for connection of a wiring harness in the vehicle body side. The connector 21 is composed of wiring ends (terminals) of the circuit 2 which are disposed in the connector housing 21a. Further, on an upper portion the inner panel 18 there is arranged a male connector 20 for connection of a door mirror driving circuit. Meanwhile, in a lower portion the inner panel 18 is formed an extending speaker-bracket 23. Moreover, approximately in the middle of the inner panel 18 there is disposed a male integrated connector 4 connected to the circuit 2 corresponding to each of the connectors 20, 21, a speaker 8, and the P/W motor 6.

The P/W motor 6, as shown in FIG. 2, is inserted into a pair of guide walls 19 unitedly formed in the inner panel 18. The P/W motor 6 includes a plurality of spring contact pieces 26a of contacting terminals 26 extending in parallel from an opening 26a of a motor case 24. Further, between the pair of guide walls 19 there is disposed a wire end portion 28 (a terminal portion) of the three-dimensional circuit 2b on an inner wall 27 of the panel 18. Complete insertion of the P/W motor 6 into the guide channels causes the spring contact pieces 26a of the contacting terminal 26 to resiliently contact the wiring end portion 28 of the circuit 2b, resulting in their electrical connection. Thence, the P/W motor 6 is directly secured to the inner unit 1.

The P/W the motor 6 has a worm gear 29 extended from the motor, the gear 29 engaging with a link-type regulating pinion or rack (not shown) to move up and down the window. The one-touch simple coupling of the P/W motor 6 decreases fitting man-hours. Moreover, the absence of lead wires used in the prior art causes no incomplete connection due to jamming or abnormal stretching in the lead wires.

The inner unit 1 is attached to the recess 14 of the door panel 3 to be secured therein. At the same time, the connectors 15, 20 of the door mirror engage to connect to each other. As an alternative to this embodiment, the inner panel 18 and the door panel 3 may be unitedly formed as is conventional without separating them. After securing the inner unit 1, a door trimming member 30 made of a synthetic resin is fixed to the door panel 3 over the inner unit 1. The door trimming member 30 has a laterally elongated opening 31 passing the arm rest unit 13 through it. The arm rest unit 13 joints to the door panel 3 with the inner unit 1 therebetween by way of the opening 31. The relative connectors thereof also connect to each other.

On a top portion of the arm rest body 32 made of a synthetic resin there are switches of standard specifications such as a P/W motor switch 33, a door locking switch 34, and a door mirror moving switch 35.

On a side portion of the body 32 there are disposed optional switches 36 and a courtesy lamp 10 (an auxiliary component). On another side of the body 32 is extended an engagement piece 37 associated with the engagement projection 16 in the door panel 3. The body 32, at a side end thereof, has fixing bolt holes 38 relating to the inner panel 18.

FIG. 3 shows mainly an inner structure of the arm rest unit 13. The arm rest the body 32 opens in one side (toward the inner unit 1). In the arm rest unit 13 and under a board 39 of the switches 33 to 35, a box-shaped case 41 (a receiving portion) is unitedly formed to receive a control unit 40. The case 41 has an opening 43 in line with an opening 42 of the arm rest the body 32. An inner wall 44 of the case 41 has a pair of right and left guide rails 45. The guide rails 45 receive slidably a control circuit board 12 of the control unit 40.

On a top surface of the control circuit board 12 is provided with a plurality of contacts 56 corresponding to the standard switches 33 to 35. On an under surface of the board 12 is disposed control circuits 57 connected to the contacts 56 and a female integrated connector section 5. The control circuit board 12 and the connector section 5 compose the control unit 40. The control circuits 57 have connected to electronic parts such as a CPU, a RAM, or a ROM. The connector section 5 has a terminal portion 46 in a housing 5a of the section 5, enabling its engagement and connection to the integrated connector 4 in the inner unit 1. The control unit 40 has been detachably received in the case 41 to be easily replaced, satisfying optional specifications for the switches.

The opening 43 receives a cover 47 of the case 41. The cover 47 has an insertion opening 48 corresponding to a male integrated connector portion 4 in the inner unit 1. Meanwhile, without using the cover 47, the inner panel 18 may include a cover unitedly three-dimensionally molded of an insulating resin. Moreover, the inner panel 18 may alternatively have a three-dimensional configuration including a case for receiving the control unit 40.

The contacts 56 on the control circuit board 12 locate just beneath the standard switches (keytop type) 33 to 35, turning on or off the contacts 56 by the switch operation. Across an inner wall 44 of the case 41 and an inner wall 49 of the arm rest main body 32, a three-dimensional circuit 50 is integrally disposed by plating, imprinting process, or the like. Further, the case 41 includes a circuit 50a constituting a wire end portion (not shown) for connection to the control circuit board 12. Inserting the control circuit board 12 into the case 41 causes connection between the control circuit board 12 and the circuit 50a.

On the inner wall 49 of the arm rest body 32, the circuit 50 connects to the optional switch 36 and the courtesy lamp 10 (FIG. 1). The switch 36 and the lamp 10 are accomodated respectively in cases 51, 52 unitedly molded to inwardly project from the inner wall 49 of the arm rest body 32. The optional switch 36 and the courtesy lamp 10 having been received in the cases 51, 52 connect to the relative terminals (not shown) of the three-dimensional circuit 50.

Further, the arm rest body 32 has a male connector 53 at an aft end thereof. The male connector 53 corresponds to the female connector 17 for the door locking unit 9 in the door panel 3. The male connector 53 includes both a housing 53a unitedly formed with the inner wall 49 of the arm rest body 32 and a terminal portion 54 of the three-dimensional circuit 50. The terminal portion 54 is disposed inside the housing 53a. Unitedly molding of the cases 51, 52 and the connector portion 53 with the arm rest body 32 can decrease the number of assembling parts.

Fitting the arm rest unit 13 to the door panel 3 causes the integrated connectors 4, 5 to connect to each other and also causes the door locking connectors 17, 53 to engage for their connection. Besides, the circuit 50 having closely integrated with the arm rest body 32 enables accurate alignment between the integrated connector 5 and the door locking connector 53. That is, the alignment accuracy of the connectors 5, 53 is satisfactorily determined by the resin molding tolerance of the arm rest body 32. However, the door locking connector 53 may be a connector being moved longitudinally and vertically to align with the opposing one.

Figure 4:
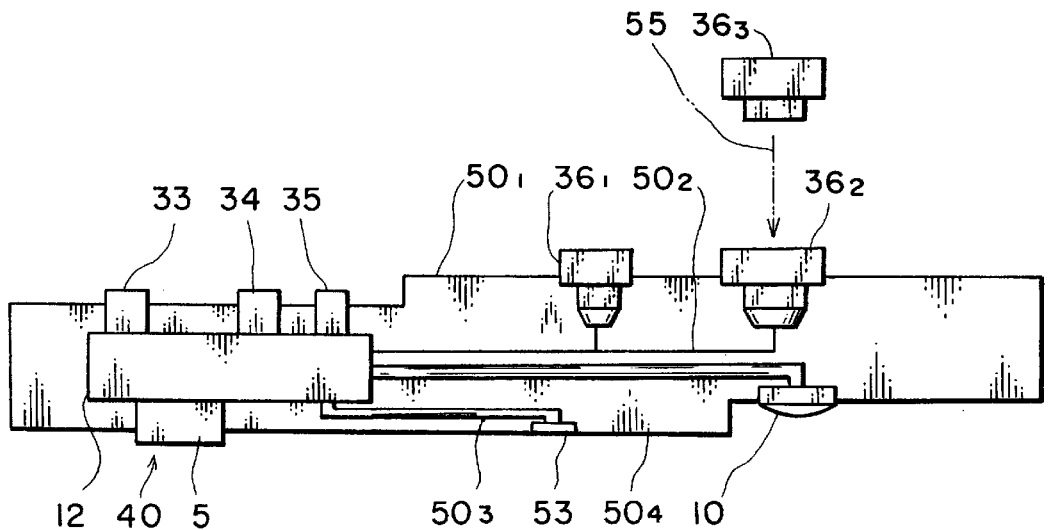
FIG. 4 is an explanatory illustration showing a connection state of a control circuit in the arm rest unit.
Figure 5:
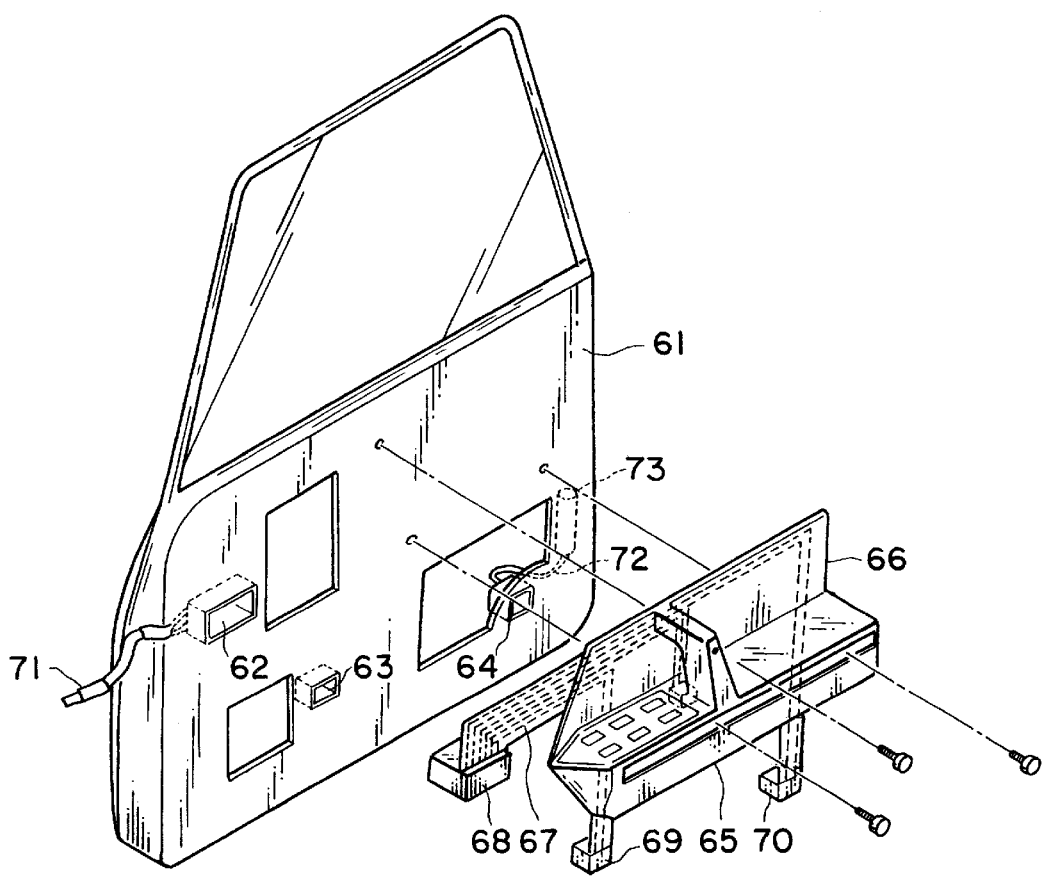
FIG. 5 is an exploded perspective view showing a known circuit and its connecting structure assembly.

FIG. 4 is an illustration showing a circuit connection state of the control unit 40, the switches, and the auxiliary components.

The control circuit board 12 has connected to the P/W motor switch 33, the door locking switch 34, and the mirror switch 35. A circuit $50_1$ of the switches 33, 34, 35 has connected to optional switches $36_i$, $36_2$. The optional switches $36_1$, $36_2$ have connected to the control circuit board 12 by way of a multiplex circuit $50_2$. Further, the control circuit board 12 has been directly fitted with the integrated connector 5 and also has connected to the door locking connector 53 and the curtsy lamp 10 respectively by way of each of circuits $50_3$, $50_4$.

The control circuit board 57 includes a control circuit that has a multiplex communication function for the peripheral auxiliary components and a programmable function for the switches. The programmable function enables the application of optionally specified switches such as a seat memory switch or a fuel lid switch. Thence, without altering the circuit pattern of the optional switches $36_1$, $36_2$, various signal data processing can be carried out by altering or selecting software in the control circuit. As a result, the control circuit board 57 can handle simultaneously several types of function switches. As shown in a chain line 55, a new optional switch $36_3$ having another specification can be easily applied in place of, for example, the switch $36_2$ by replacing the control circuit board 12 (ROM).

Next, operational effects of the assembly will be discussed.

In the assembly according to this invention, as described above, fitting the arm rest unit to the door panel causes simultaneously connection of the relative circuits, resulting in a more efficient completion work of the circuits in and around the door. The arm rest unitedly including the relative circuits, the switch cases, the auxiliary component cases and their connectors allows decrease in the number of assembling parts. Further, in comparison with a known door trimming member unit integrally including auxiliary components and their circuits, this invention provides a more compact arm rest unit, causing an improved productivity in manufacturing and in fitting to the door panel with regard to the unit. Besides, the programmable optional switches enable standardization in the circuits and the arm rest unit, of which application to various types of vehicles, for example, of different grades or for specified countries is easily accomplished. In addition, the auxiliary components such as the P/W motor have pre-arranged connectors, thereby deleting lead wires that has the disadvantage of jamming when assembled, resulted in giving an improved reliable electrical connection. Moreover, the integration of the wiring harnesses, the control circuits, and the auxiliary components including the P/W motor improves control accuracy.

What is claimed is:

1. A circuit and its connecting structure assembly provided in a motorcar door comprising:

an inner unit adapted to be joined to a door panel, and an arm rest unit attached on said inner unit, wherein said the inner unit includes an inner panel provided with a circuit, an auxiliary component connected to said circuit, and an integrated connector; and said arm rest unit includes a connector portion corresponding to said the integrated connector, a control circuit board connected to said connector portion and to a switch section for the auxiliary component, and a circuit provided in a body of said arm rest and connected to said control circuit board.

2. An assembly as claimed in claim 1, wherein said auxiliary component in said inner unit has a plurality of outwardly exposed contacting terminals, and the circuit in the inner panel has a wiring end portion for connection of said contacting terminals.

3. An assembly as claimed in claim 1, wherein said control circuit board is detachably mounted in a compartment formed in the arm rest unit.

4. An assembly as claimed in claim 1, wherein said arm rest unit is integrally formed with a switch case, a receiving case for said auxiliary component, and a connector housing of a connector mounted in the door panel, and said cases and said connector housing are respectively provided with a wiring end portion for the circuit provided in said arm rest unit.

5. An assembly as claimed one of claims 1 to 4, wherein a plurality of switches connect to the circuit provided in said arm rest unit, and software replacement of said control circuit board can change the functions of said plurality switches.

6. An assembly as claimed in claim 1, wherein joining said arm rest unit to said the inner unit causes simultaneous connection between the integrated connector of said inner unit and the connector portion of said arm rest unit.

7. An assembly as claimed in claim 1, wherein said inner unit has a plurality of auxiliary components including a power window motor and a speaker.

8. An assembly as claimed in claim 7, wherein said inner panel of said inner unit has a channel structure receiving said power window motor, the channel structure having a circuit terminal disposed in such a way that complete insertion of a motor case of the power window motor into said channel structure causes said circuit terminal to make contact with a spring contact provided in the motor case.

9. An assembly as claimed in claim 1, further comprising a switch connected to said circuit of said arm rest unit.

* * * * *